United States Patent [19]

Matteson et al.

[11] 4,345,825

[45] Aug. 24, 1982

[54] APPARATUS FOR AUTOMATIC CONTROL OF A PHOTOGRAPHIC CAMERA

[75] Inventors: Lawrence J. Matteson, Rochester; Roger J. Greenwald, Churchville; Carl N. Schauffele, Rochester, all of N.Y.

[73] Assignee: Eastman Kodak Company, Rochester, N.Y.

[21] Appl. No.: 103,260

[22] Filed: Dec. 13, 1979

[51] Int. Cl.³ .......................................... G03B 7/091
[52] U.S. Cl. .................................................. 354/23 D
[58] Field of Search ............................ 354/23 D, 195

[56] References Cited

U.S. PATENT DOCUMENTS

| | | | |
|---|---|---|---|
| 3,522,764 | 8/1970 | Biber et al. | 354/195 |
| 3,917,395 | 11/1975 | Ogawa | 354/23 D |
| 3,945,023 | 3/1976 | Stauffer | 354/25 |
| 4,103,307 | 7/1978 | Shinoda et al. | 354/23 D |

OTHER PUBLICATIONS

An Optical Merit Function (SQF), which correlates with Subjective Image Judgements, by Granger et al., Photographic Science and Engineering, vol. 16, No. 3, May-Jun. 1972.

The Designer's Guide to Programmed Logic featuring the 8080 Microprocessor, Pro-Log Corp., Jul. 1977.

Primary Examiner—Michael L. Gellner
Attorney, Agent, or Firm—Thomas H. Close

[57] ABSTRACT

Automatic control apparatus for a photographic camera is responsive to a set of measured scene parameter inputs, representing at least subject distance and subject brightness, to produce signals representing the desired setting of one or more of the following camera control functions: aperture size, shutter time, flash output, and lens extension. The desired camera settings are determined by a mapping function defining the settings that optimize picture quality by minimizing the total reduction in picture quality due to the combined effects of blur, smear and exposure error. The mapping function is obtained by maximizing a Composite Quality Factor comprising one or more Subjective Quality Factors representing blur, smear, and exposure, evaluated at the subject distance and at a plurality of background distances.

11 Claims, 19 Drawing Figures

APPARATUS FOR AUTOMATIC CONTROL OF A PHOTOGRAPHIC CAMERA

BACKGROUND OF THE INVENTION

1. Field of the Invention

The present invention relates to photographic cameras, and more particularly, to apparatus for determining optimum operation of adjustable camera mechanisms based on measured scene parameters.

2. Description Relative to the Prior Art

For every photograph made with a camera having adjustable mechanisms, a decision must be made, either by the camera designer or the photographer (or both), as to the adjustments that will provide an optimum quality picture. In the past, generally defined guidelines have determined what combinations of, say, aperture size, exposure time, flash energy output, and lens focus position would be used for each picture.

As an example, consider a photographic situation in which a group of people (photographic subjects) are seated around a table in a room. Assume that the photographer is equipped with a camera having adjustable shutter speed, aperture size, focus position, and variable flash output. The photographer is faced with a perplexing range of choices in taking the picture. One possible choice would be a hand-held "existing light" exposure. Generally, for such an exposure, the photographer chooses the maximum aperture size of which the camera is capable, and hence the minimum shutter time consistent with nominal exposure. These camera adjustments result in the minimum degradation to the picture due to camera shake, which under the circumstances, may still be appreciable. The depth of focus is minimized by the large aperture and it is therefore possible that there will be no single focus position at which all of the people in the scene are in focus. Consequently, the photographer may wish to select a compromise focus position that places best focus somewhere between the nearest subject and the more distant subjects. Both foreground and background subjects will be equally well (or poorly) focused.

Alternatively, the photographer may choose to employ flash illumination to take the picture. In this case, the photographer might select the minimum aperture size consistent with the maximum output of the flash device. The shutter speed will be the minimum required to synchronize the flash output with an open shutter. Degradation of the picture due to camera shake is virtually eliminated, and due to the small aperture, the depth of focus is generally improved over the "existing light" exposure. Unfortunately, a large variation in exposure between the foreground and the background may result because the flash illumination diminishes in proportion to the square of the distance from the flash device.

Faced with the above choices, the enlightened photographer may want to compromise between "existing light" and flash exposure to achieve a more nearly optimum quality photograph. If so, he would want to select an aperture size and shutter time which together would result in a certain amount of underexposure, and would want to supplement the exposure with a certain amount of flash illumination to improve the exposure as much as possible. Perhaps he would want to slightly overexpose the closest subjects to improve the exposure of subjects farther away, in which case, he would choose a shutter time and aperture combination that would optimally compromise between camera shake and depth of field. He may also want to choose a lens extension that would give an optimum balance between the sharpness of the nearest and farthest subjects.

A skilled photographer with a thorough knowledge of his equipment and knowledge of the general principles of photography may be able to select a camera adjustment, based on his knowledge, intuition and experience, that would result in a nearly optimum compromise. Heretofore, however, such performance has been beyond the reach of the average photographer. Short of trial and error, a systematic means has not been available, even to the skilled professional, for determining the camera adjustment which will result in an optimum quality photograph. Even in the most advanced, fully automatic cameras of the prior art, automatic control apparatus has not been provided for effecting the various compromises between camera settings that result in a picture of optimized overall quality. This problem is particularly apparent in highly automatic "instant" cameras. Cameras presently on the market provide automatic exposure control and automatic focusing. Automatic focusing is a desirable feature, because the quality of many amateur photographs taken by cameras which employ manual focusing is degraded due to focus error. Since the exposure latitude of instant film is very narrow, correct exposure is critical to an acceptable picture. One of the biggest problems in this area has been the control of exposure when a flash device is employed to supplement the illumination of the scene.

One highly automatic camera, typical of the state of the art, is shown in U.S. Pat. No. 3,917,395, issued Nov. 4, 1975 to F. T. Ogawa. Ogawa discloses a camera featuring automatically controlled focus, exposure, and flash output. The control circuit of the camera is responsive to a number of measured scene parameters to control the automatic functions. The lens extension is set to provide best focus at a distance determined by an automatic range finder. The maximum effective aperture and shutter time for each exposure are determined in response to measured scene light.

FIGS. 1a and b of the present application show, qualitatively, the exposure control program of this prior art automatic control system. As shown in FIG. 1a, the control system provides progressively larger apertures and longer shutter times for progressively lower light levels until a point is reached where the flash is enabled. The flash device provides a constant output of light, and exposure is controlled during flash operation by adjusting the aperture (and consequently the shutter speed, due to the mechanical design of the aperture/shutter) as a function of distance as shown in FIG. 1b. As can be seen from FIGS. 1a and b, this prior art control system, although highly automated, does not effect a compromise between aperture size and shutter speed as a function of subject distance nor does it provide for a compromise between the quantity of flash exposure versus ambient exposure as a function of scene brightness and/or subject distance. The system does not provide the possibility of compromising exposure for sharpness. The automatic focusing feature does not allow for a lens extension that produces a best focus that compromises between the sharpness of the near subject and the sharpness of the background.

Accordingly, there is still a need for an automatic camera control apparatus capable of effecting the abovenoted compromises so that an optimum overall quality photograph may be achieved.

SUMMARY OF THE INVENTION

Conceptually, the present invention provides apparatus for automatically selecting the camera adjustment that will result in a picture of optimized overall quality. In selecting such adjustment, optimized compromises are made among the exposure and sharpness of the main subject and the background of the scene to minimize the total reduction in picture quality due to the combined effects of blur, smear and exposure error. Those camera adjustments are chosen that maximize a normalized quality factor (hereinafter described) representing the overall perceived quality of the resulting photograph.

The resulting operation of one embodiment of the automatic camera control apparatus according to the invention may be thought of as providing a unique exposure control program for each subject distance. This set of programs is shown qualitatively in FIG. 2, where $D_1, D_2, \ldots D_n$ represent progressively larger subject distances. The resulting set of exposure control programs is to be compared with the prior art camera control system which produces only one program as shown in FIG. 1. FIG. 2 further illustrates the variable flash output capabilities of the camera control system according to the present invention, whereby, a form of fill flash—blending smoothly into full flash—is provided by the control apparatus. Note that at some distance $D_n$ the main subject is too far away for flash illumination to improve the picture, and, consequently, no flash is provided.

According to the invention, a photographic camera having an adjustable mechanism, capable of affecting picture quality (and including one or more of the following camera functions: aperture size, shutter time, flash output and lens extension) is provided with an automatic control apparatus including means for measuring a plurality of scene parameters, including at least subject brightness and subject distance, for determining the adjustment of the mechanism. The control apparatus includes a memory that is supplied with signals representing the measured scene parameters and a set of signals representing a mapping function. For every combination of scene parameter measurements, the mapping function defines a control signal representing the particular camera adjustment that will maximize a Composite Quality Factor (CQF) where the CQF yields a quantitative prediction of the overall quality of a photograph resulting from a particular combination of camera adjustment and scene parameters. The CQF comprises one or more Subjective Quality Factors representing blur, smear and exposure, evaluated at a main subject distance and at a plurality of background distances. A logic and control unit derives, from the measured scene parameter signals and the signals representing the mapping function, a control signal representing the particular adjustment of the mechanism that will maximize the CQF for the particular values of the measured scene parameters. An output device, having a plurality of controllably selectable states, representing a plurality of possible adjustments of the control mechanism, responds to the control signal in such a way as to assume the state corresponding to the particular adjustment selected by the logic and control unit.

A preferred embodiment of the invention is employed in a camera having an automatic light sensitive circuit for measuring the brightness of the main subject and an automatic ranging device for measuring the distance to the main subject. The camera also includes an optical system that can be automatically adjusted for focus in response to a control signal, automatically adjustable aperture and shutter, and a variable output flash device.

Before each exposure, the control apparatus receives from automatic sensors, signals representing the brightness and distance of the main subject and temporarily stores these signals in the memory. Stored also in the memory are signals representing a mapping function for deriving the control signals that will maximize a Composite Quality Factor (CQF) representing the sharpness and exposure of parts of the scene including the main subject and the background. The logic and control unit of the control apparatus produces a control signal, in response to the measured scene parameter signals and the mapping function signals, for the lens extension, aperture size, shutter speed and flash device output. In this way, the compromises among the lens position, aperture size, shutter speed and flash output required to produce a picture of optimum overall quality are effected automatically by the camera control apparatus.

The camera control apparatus according to the preferred embodiment of the invention behaves in at least two unexpected ways. Observation of the operation of the control system has shown that it chooses the lens extension partially as a function of scene brightness, often resulting in a focus position that is slightly behind the main subject, to yield a photograph of improved overall quality. Also it has been observed that the camera control system controls exposure as a function of range in ambient illumination, preferring smaller apertures for close subjects, and larger apertures for more distant subjects. A smaller aperture allows a hyper-focal setting closer to the camera thereby placing objects from near to infinity in sharp focus. For a larger aperture, the hyper-focal distance is farther away from the camera but the larger aperture results in less smear due to camera motion, since a faster shutter time can be used with the larger aperture. Thus the automatic control apparatus according to the present invention effects the compromises required for maximizing overall picture quality.

DESCRIPTION OF THE DRAWINGS

The invention will be described with reference to the following drawings, wherein.

DESCRIPTION OF THE PREFERRED EMBODIMENT THE COMPOSITE QUALITY FACTOR

Figure 1A:
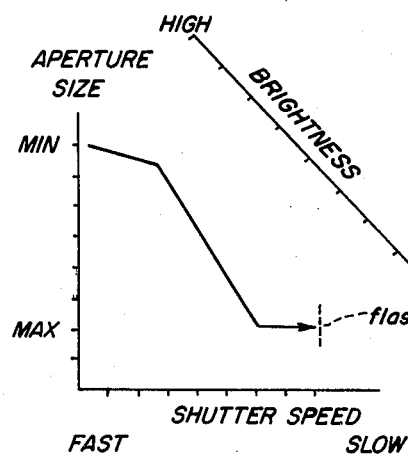
FIGS. 1a and 1b are graphs showing, qualitatively, the exposure control program of a typical prior art automatic camera control system.
Figure 1B:
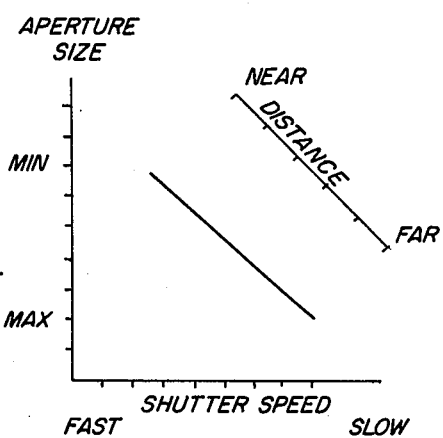
Figure 2:
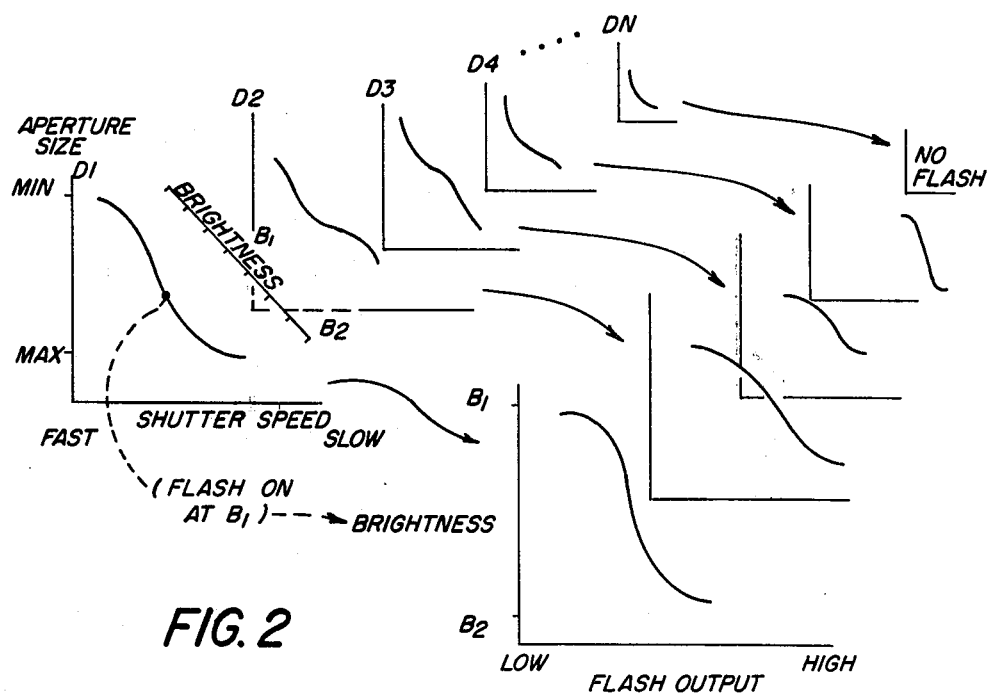
FIG. 2 illustrates how, in effect, the automatic camera control apparatus of the present invention follows a unique exposure control program for each subject distance to optimize the perceived overall quality of each photograph.

The Composite Quality Factor (CQF) according to which the present invention maximizes the overall quality of a photograph, is comprised of a number of Subjective Quality Factors (SQF's). Each of the SQF's is intended to isolate a particular subjectively perceived aspect of camera performance. The largest influences on perceived picture quality are sharpness and exposure. The exposure-related SQF is hereinafter referred to as "SQF(EXPOSURE)" Sharpness, in turn, can be analyzed into a contribution due to: (1) the optics of the camera system and the response of the film, hereinafter referred to as "SQF(BLUR)", and (2) relative motion between the camera and the subject, hereinafter referred to as "SQF(SMEAR)".

Each of the SQF's relates the spatial frequency response of the camera-film combination, on a normalized scale from 0 to 1, to a particular contributor to image quality reduction. A one (1) of the SQF scale represents the maximum performance capability of the camera-film combination, and a zero (0) represents performance of the system that would result in a picture of extremely low quality. The SQF(BLUR) can be calculated from the cascaded Modulation Transfer Functions (MTF's) of the camera lens and the film. MTF is a measurement used to describe the ability of lenses, films, and other optical components to reproduce the detail contained in an object. It is the modulus of the Optical Transfer Function and as such contains amplitude but not phase information. In addition to lens surface curvatures and optical indices, the lens MTF is influenced by the aperture size, the subject range, and the lens extension.

SQF(SMEAR) is a function of the relative motion between the camera and the subject. Such relative motion arises from camera shake and subject motion. The SQF(SMEAR) for hand-held photography is strongly a function of exposure time, since the longer the shutter is open, the more likely it is that the photographer will shake the camera during the exposure.

The SQF(EXPOSURE) can be related to a reduction in the resolution of lines in a manner similar to the SQF(SMEAR) and SQF(BLUR) by observing that the depth of modulation, at all spatial frequencies, of an under or overexposed image is, in general, lower than that of a more optimally exposed image. Under ambient illumination conditions, the tolerance of SQF(EXPOSURE) to departures from an optimum exposure will depend on the exposure latitude of the film. Under flash illumination conditions, the SQF(EXPOSURE) will also be strongly dependent on the distance from the flash device, due to the inverse square law of illumination.

A photograph normally includes images behind the principal subject plane, i.e. the background. It has been found that of two pictures with identical quality subjects, one with a sharper, better-exposed background will generally be preferred by a viewer. Taking this observation into account, the CQF has been defined in a way that includes the quality of the background. To do this, the CQF is evaluated at distances (D) between the subject and infinity and integrated over this range. In practice the CQF is integrated over the reciprocal range or vergence (V) where $V=1/D$. The integrated form of CQF thus becomes:

$$CQF = \int_0^{V_s} \frac{SQF(BLUR) \cdot SQF(SMEAR) \cdot SQF(EXPOSURE)}{V_s} dV \quad (1)$$

where: $V_s$ is the reciprocal of the distance (D) to the main subject.

Use of the CQF in cooperation with the preferred embodiment of the automatic camera control apparatus to select optimal settings of the camera control functions will be described in detail after a description of the control apparatus.

Figure 3:
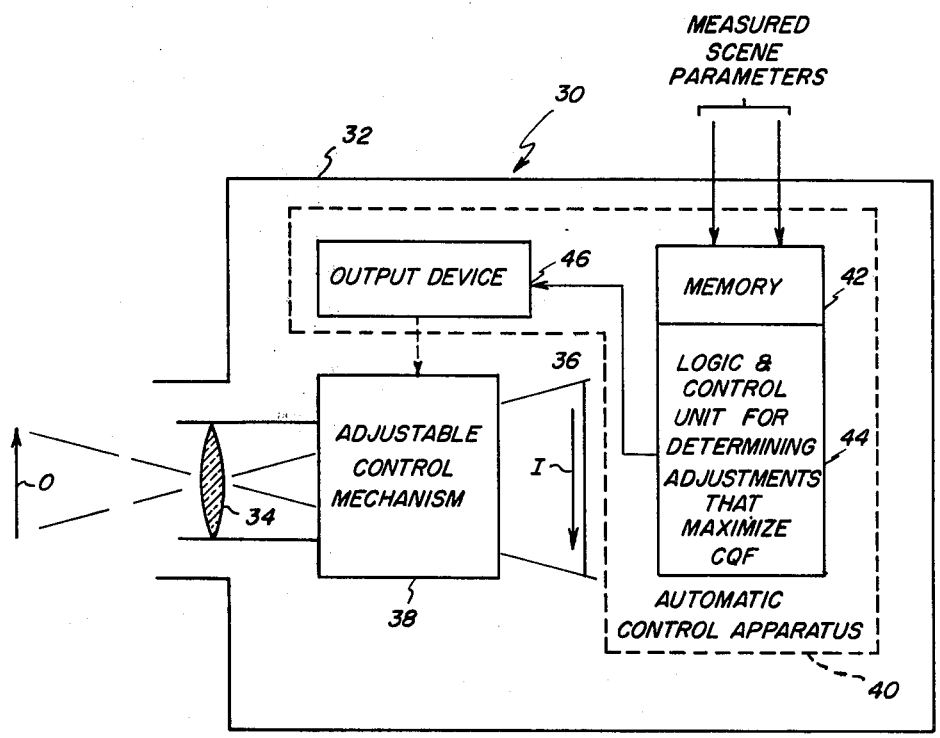
FIG. 3 is a block diagram showing the general arrangement of an automatic camera control apparatus in a camera, according to the present invention.

FIG. 3 is a schematic diagram of a camera incorporating an automatic control apparatus according to the present invention. A camera generally designated 30, includes a camera body 32 and a lens 34 for forming an image I of an object O on a film 36. The camera includes an adjustable mechanism 38 which may comprise an adjustable aperture, shutter, focusing means, and flash output and various combinations of these and other elements that may affect the photographic quality of a picture taken by the camera. An automatic camera control apparatus generally designated 40, includes a memory 42 for storing measured scene parameter data and a CQF related mapping function for mapping a set of measured scene parameter data into a set of control signals. A logic and control unit 44, responsive to the measured scene parameter data and the mapping function, determines the camera settings that will maximize the overall quality of the picture for the given scene parameters, based on maximizing the CQF, and produces control signals representative of the optimum camera settings. An output device 46 responds to the control signals from the logic and control unit to assume a state representative of the desired adjustment.

THE ADJUSTABLE MECHANISM

Figure 4:
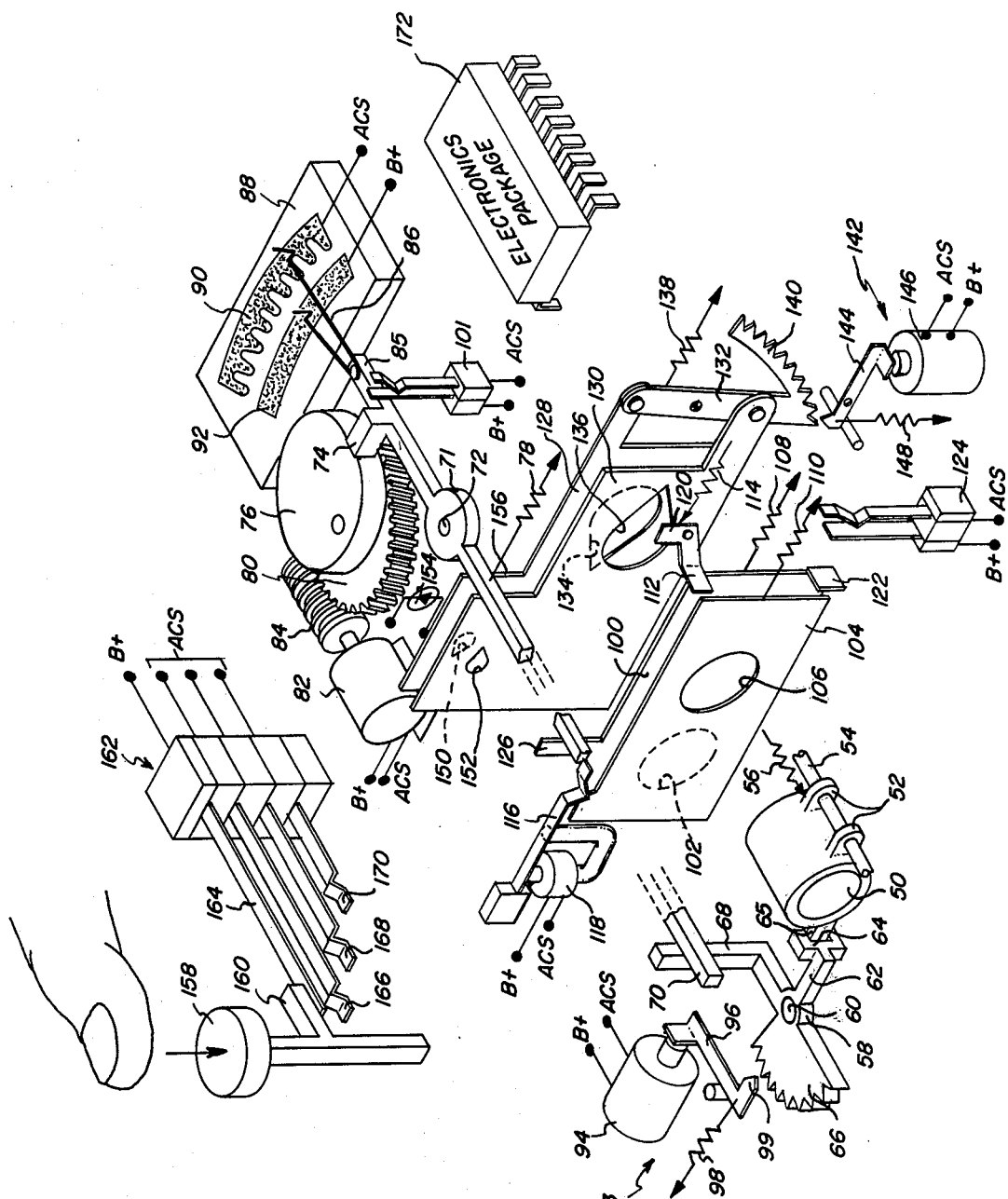
FIG. 4 is an exploded perspective view of the adjustable camera mechanism employed with a preferred embodiment of the present invention.

Refer now to FIG. 4, showing an adjustable mechanism suitable for use with a preferred embodiment of the present invention. The mechanism includes a movable lens element 50 having a pair of tabs 52 by which the lens element is constrained to slide to and fro on a support rod 54. The lens element 50 is urged in a forward direction, as shown in FIG. 4, by a spring 56. A crank 58 mounted on a pivot pin 60 includes a leg 62 with a forked nose portion 64 that is adapted to engage a tab 65 on the side of the lens element 50. The crank also has a ratchet sector 66 and an offset arm 68. Nose 64 of crank 58 is urged into contact with tab 65 of lens element 50 by the engagement of arm 68 with a forearm 70 of a control lever 71 arranged to pivot about a pin 72. Control lever 71 has a cam follower portion 74 that is urged into contact with a cam 76 by a spring 78. The cam 76 is attached to a gear 80 that is arranged to be driven by a motor 82 through a worm gear 84. As shown in FIG. 4 the lens element 50 is held by control lever 71 through crank 58 in a far focus position.

When motor 82 is energized to rotate cam 76 counterclockwise, as shown in FIG. 4, spring 78 pivots the control lever 71 counterclockwise about pin 72, thereby moving forearm 70 away from crank arm 68, thus allowing spring 56 to urge the lens element in a forward direction toward a closer focus position. A rear arm 85 of control lever 71 carries a wiper contact 86 which cooperates with a position sensor 88. The position sensor 88 comprises a comb-shaped control track 90 and a return track 92. Wiper contact 86 provides a circuit path from the control track to the return track each time a tooth of the comb is passed, thereby producing a series of pulses that may be employed by the automatic control system to determine the instantaneous position of lens element 50 while motor 82 is running.

In operation, when a number of pulses corresponding to the desired position for lens element 50 has been generated, an electromagnetic latch, generally designated 93 is energized to arrest the forward travel of lens element 50. The electromagnetic latch comprises an electromagnet 94 adapted to attract a pivotally mounted latch arm 96 toward its latching position. A spring 98 is mounted to bias the latch arm away from its latching position. When the electromagnet is energized, the magnet attracts one end of the latch arm causing a tooth 99 on the opposite end to engage ratchet sector 66 of crank 58, thereby stopping the lens at the desired position.

After a picture has been taken, motor 82 is energized to rotate cam 76 and return the control lever 71 to the position shown in FIG. 4. Forearm 70 of the control lever engages and displaces crank arm 68 to return the lens to its initial position. A switch 101 is positioned to be closed by the returning extension 85 of control lever 71 to thereby signal the control system to stop the motor.

Behind the lens is a shutter mechanism having an opening blade 100 with a circular aperture 102 and a closing blade 104 with a circular aperture 106. A spring 108 urges the opening blade to the right, as shown in FIG. 4, and another spring 110 urges the closing blade to the right. In the initial closed position, as shown in FIG. 4, the aperture of the closing blade is aligned with the optical path of lens element 50, but light is blocked by the opening blade whose aperture is out of alignment with the optical path. The opening blade 100 is held in the closed position by a latch 112 which is urged towards its latching position by a spring 114. An electromagnetic latch comprising a cantilevered keeper arm 116 and an electromagnet 118 is adapted, when energized, to hold closing blade 104 in the position shown in FIG. 4.

In operation, after forearm 70 of control lever 71 has moved sufficiently to allow the maximum forward movement of lens 50, the forearm 70 encounters an upward extension 120 of latch 112, causing the latch to pivot against the force of spring 114 to release the opening blade for movement to the right under the influence of spring 108. The opening blade travels to the right until the aperture 102 is aligned with the optical path of lens element 50. A tab 122 on the opening blade encounters a switch 124 which is positioned to be closed by the tab to signal that the shutter is open and that motor 82 should be stopped.

After a period of time, electromagnet 118 is deenergized thereby releasing closing blade 104 for movement to the right under the influence of spring 110 to terminate the exposure. Subsequently, motor 82 is re-started, causing cam 76 to complete one full revolution thereby returning the control lever to the position shown in FIG. 4. Upon its return, forearm 70 of control lever 71 encounters an upward extension 126 on opening blade 100 to return the opening blade to its initial position. Tab 122 of the opening blade picks up closing blade 104 to return the closing blade to its initial position. When the initial position is reached, spring 114 urges latch 112 into latching engagement with opening blade 100.

An adjustable aperture, comprising a first aperture blade 128 and a second aperture blade 130, is disposed directly behind the shutter. The two aperture blades are constrained to move in opposite directions by a walking beam 132 that is centrally pivoted and pinned at opposite ends to the blades. Each of the blades has a teardrop-shaped opening, 134 and 136 respectively. When the aperture blades are in their initial position, as shown in FIG. 4, the largest parts of the openings are in alignment to provide the maximum effective aperture. A spring 138 urges walking beam 132 in a clockwise direction, as shown in FIG. 4, to form progressively smaller apertures. The walking beam carries a tooth sector 140, that is adapted to be engaged by a latch generally designated 142. The latch comprises a pivotally mounted pawl 144 and an electromagnet 146. A spring 148 urges the pawl away from latching engagement with tooth sector 140. When the electromagnet 146 is energized, the pawl is pulled into engagement with the tooth sector to stop the aperture at the desired position.

The aperture blades also possess a secondary set of apertures 150 and 152 which are disposed in the optical path of a photocell 154 to reduce the light falling on the photocell as apertures 134 and 136 reduce the lens aperture. The photocell is arranged to receive light from the scene, preferably the central portion thereof where a main subject presumably would be located. The aperture blades are held in their initial position by engagement of the forearm 70 of control lever 71 with an upwardly projecting portion 156 of the first aperture blade 128.

In operation, as lever 71 pivots in the clockwise direction spring 38 causes blade 128 to follow forearm 70 of lever 71, thereby forming progressively smaller apertures in alignment both with lens 50 and with photocell 154. The aperture size is directly related to the number of pulses produced by position sensor 88. When a predetermined position is reached, latch 142 is energized to stop the aperture in the desired position. After an exposure, forearm 70 of control lever 71 returns the aperture to the maximum opening.

A body release member 158, which is accessible to the camera operator, has a leg 160 that is adapted to engage a switch bank 162 when the body release member 158 is depressed. The switch bank progressively supplies power from contact 164 to contacts 166, 168 and 170, respectively. Contact 166 is connected to supply main power to the automatic control apparatus. Contact 168 is connected to the automatic control apparatus to signal the apparatus to compose a photograph by measuring the subject distance and the subject brightness. Contact 170 is connected to signal the automatic control apparatus to complete a photographic operation. The memory and logic and control portions of the automatic control apparatus are contained in an electronics package 172 and receive inputs from the various switches and sensors and controls the various solenoids in the apparatus shown in FIG. 4.

THE CAMERA CIRCUIT

Figure 5:
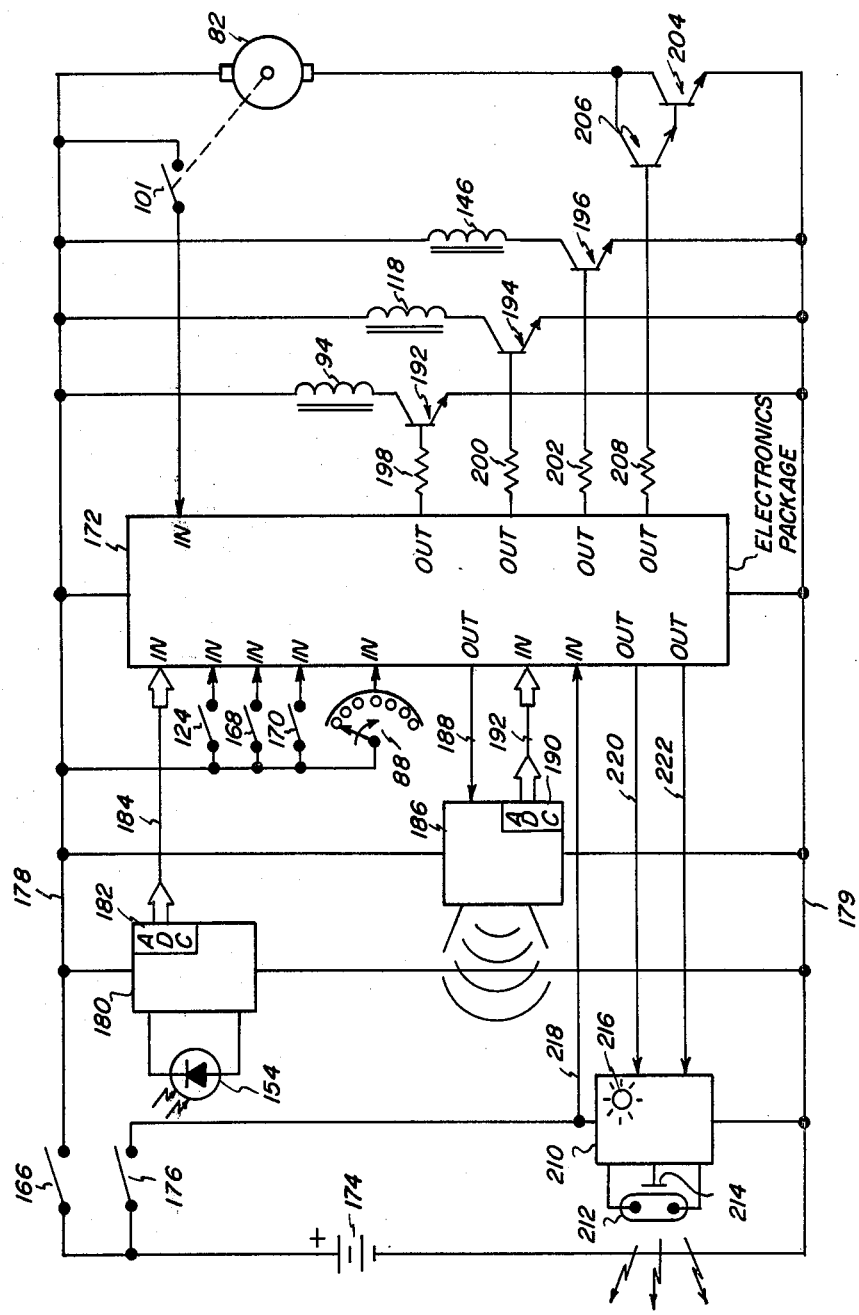
FIG. 5 is a schematic circuit diagram showing the preferred embodiment of the automatic camera control apparatus in cooperation with the adjustable camera mechanism depicted in FIG. 4.

Turning now to FIG. 5, there is shown a camera circuit employing an automatic control apparatus according to the present invention to control the camera mechanism shown in FIG. 4. Switches and other elements shown in FIG. 4 are similarly numbered in FIG. 5.

Power for the circuit is obtained from a battery 174, the positive terminal of which is connected to a main power switch 166 and a manually operated flash power switch 176. The main power switch 166, when closed, connects the positive terminal of the battery to a positive bus 178. The negative terminal of the battery is connected to a return bus 179. Positive bus 178 supplies power to the electronics package 172. The return is provided to the electronics package by return bus 179. The specific structure of a preferred embodiment of the electronics package 172 will be described in further detail below.

A light sensitive circuit 180 is connected between positive bus 178 and the return bus 179. The light sensitive circuit includes a photosensitive element 154, such as a silicon photodiode, and suitable signal processing electronics for generating a signal proportional to the brightness $B_s$ of the main subject. The specific details of the light sensitive circuit are not shown since the circuit does not constitute part of the present invention. Any number of light sensitive circuits as employed in automatic exposure control systems are suitable for use herein, the only requirement being that the output signal of the circuit represent the brightness of a main portion of the scene. This scene brightness signal is converted to a digital signal suitable for use by the automatic control apparatus by an analog-to-digital converter 182 and is supplied on command in digital form to electronics package 172 on lines 184. The electronics package requests the scene brightness signal by applying a signal to line 183, and is notified that the scene brightness signal is ready by a signal on line 185.

An automatic range finding device 186 is also connected between positive bus 178 and return bus 179. The specific details of the range finding circuit 186 are not shown, since this circuit does not comprise a part of the present invention. Several of the presently known automatic range finding devices are suitable for use herein. See, for example, the sonic range finding device disclosed in U.S. Pat. No. 3,522,764 entitled Range Finding and Focusing System for Photographic Cameras and the Like by C. H. Biber, granted Aug. 4, 1970; or the solid-state range finding device disclosed in U.S. Pat. No. 3,945,023 entitled AutoFocus Camera with Solid-State Range Finder by N. L. Stauffer, granted Mar. 16, 1976. The range finding circuit, when signalled by the electronics package 172 via line 188 determines the range to the main subject, i.e. that subject which is in a principal part of the picture, preferably designated by fiducial marks in the camera viewfinder. The range finding device generates a signal $D_s$ indicative of the distance to the main subject. The distance signal is converted to a digital signal suitable for use by the automatic control apparatus by an analog-to-digital converter 190 and is supplied in digital form to electronics package 172 on lines 192. The range finding device notifies the electronics package that the distance signal is ready by a signal on line 193.

The control switch 124, which indicates that the shutter is open; the control switch 168 which directs the automatic control apparatus to measure scene light and subject distance; the control switch 170, which directs the automatic control apparatus to take a picture; and the position sensor 88, which indicates the relative position of control lever 71, are all connected in parallel between positive bus 178 and the electronics package. When closed, the respective control switches provide logic signals to the electronics package.

Electromagnet 94 which activates the lens position latch; electromagnet 118, which holds the closing shutter blade latch; and electromagnet 146, which activates the aperture position latch, are connected between the positive bus 178 and return bus 179 through the collector-to-emitter paths of transistors 192, 194 and 196, respectively. The base electrodes of the transistors 192, 194 and 196 are connected to the electronics package 172 through resistors 198, 200 and 202, respectively.

Positive bus 178 is also connected to one input of motor 82. The motor is controlled by transistor pair 204 and 206 connected in a Darlington configuration in the return leg of the motor circuit. The base of transistor 206 is connected, through resistor 208, to the electronics package. Switch 101 is mechanically coupled to the motor 82 via the control lever 71 (see FIG. 4) and electrically connected to the positive bus 178 for providing a signal to control system 172.

Switch 176 is closed by the camera operator by means of a manually operable slide, or the like, or by the movement of a camera element such as a cover member which must be moved as a prerequisite to using the camera. When closed, this switch supplies power to an electronic flash circuit 210. The flash circuit is of the type which employs a flash tube 212 that is energized by relatively high voltage developed on a firing capacitor (not shown). The flash tube 212 has a trigger electrode 214. The circuit also has a ready light 216 for indicating to the photographer when the firing capacitor is suitably charged. The specific details of the flash circuit are not shown since the circuit does not constitute a part of the present invention. A number of flash circuits known in the art are suitable for use herein, the only requirement being that the circuit be responsive to a signal to fire the flash and responsive to another signal for quenching the flash output. Power input to the flash circuit from switch 176 is also connected to an input of the electronics package by line 218 to indicate to the control system when the flash device is powered. The signal controlling the firing of the flash circuit is supplied from the electronics package by line 220 and the quench signal is supplied from the electronics package by line 222.

THE ELECTRONICS PACKAGE

Figure 6:
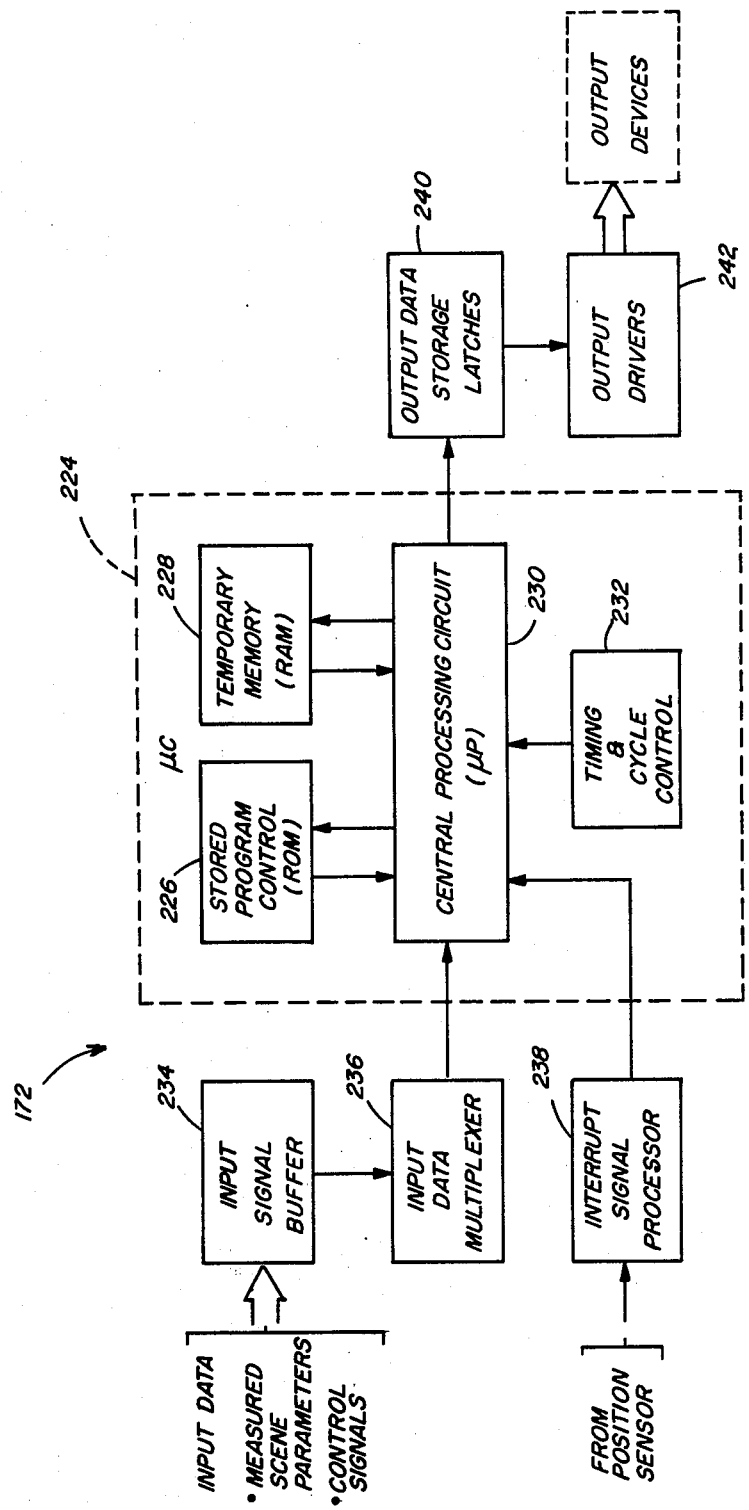
FIG. 6 is a block diagram of the preferred embodiment of the electronics portion of the automatic camera control apparatus.

FIG. 6 shows the electronics package in more detail. The electronics package preferably contains a microcomputer 224 and its associated input and output signal-conditioning circuits. Although a microcomputer is described, it is to be understood, that the invention could also be embodied in custom designed circuits. The microcomputer 224 includes a stored program control memory 226, a temporary data storage memory 228, a central processing circuit, i.e. a microprocessor 230, and a timing and cycle control unit 232.

Programming a microprocessor, such as an INTEL 8008 or Model 8080 microprocessor (which can be used in accordance with the present invention), is a skill well understood in the art. The following disclosure is written to enable a programmer having ordinary skill in the art to produce an appropriate program for the computer. The particular details of any such program would of course depend upon the architecture of the selected computer.

Data input and output are performed sequentially under program control. Input data are applied through an input signal buffer 234 to a multiplexer 236 or directly to central processing unit 230 through an interrupt signal processor 238. The input signals to the input data multiplexer are derived from the various control switches 124, 168, 170 and 101 (see also FIG. 5) and the measured scene parameters are derived from analog-to-digital converters 182 and 190. The input signal to the interrupt signal processor is derived from position sensor 88. The output data and control signals are applied to storage latches 240 which, in turn, provide suitable control signals to output drivers 242. The output drivers are directly coupled to leads which supply control signals to output devices such as the motor 82 and electromagnets 94, 118 and 146. The operation of the automatic control apparatus can be programmed by changing the instructions stored in the computer memory. This programming technique provides a flexible camera control apparatus and extends the capability of the control apparatus to include the capacity for performing other camera functions. For example, if several types of film may be used in the camera, sensors may be provided to sense indicia on a film container that indicate relevant photographic parameters, such as film speed, exposure latitude or number of exposures. The microcomputer may hold several control programs, the proper one to be selected or suitably modified in response to the particular indicia that are detected.

The program is located in the stored program control memory 226 which may comprise a conventional read-only memory (ROM). The ROM contains the operational program in the form of instructions and fixed binary numbers corresponding to numerical constants. These data are permanently stored in the ROM and are not altered by the computer operation.

Typically, the ROM 226 is programmed at the manufacturer's facility, and the instructions programmed provide the required control functions as described below. For a specific example, the total ROM capacity may be approximately 2,000 bytes. Each byte being 8 bits in length.

The temporary memory 228 may be provided by a conventional random access memory (RAM). RAM differs from ROM in two distinct characteristics:

1. data stored in a RAM are destroyed by removal of power; and
2. the stored data are easily altered by writing new data into memory.

For example, the RAM capacity may be 256 bytes, each byte being 8 bits in length. Data such as subject distance and subject brightness, and computed values for camera functions are stored in the RAM until the completion of a photographic cycle. The RAM is also used to store intermediate data generated by the computer in calculating the desired adjustments for the camera functions.

Turning now to FIGS. 7-10, there is shown a flow chart for the operation of the microcomputer 224 (see also FIG. 6). To begin this operation, the photographer depresses the body release member 158 that closes switch 166 thereby applying power to the camera control apparatus. The first thing that the computer 224 does is to determine, by sampling the input to the microprocessor from switch 168, whether or not the photographer would like to compose a picture. If switch 168 has been closed, a signal will be present at the input and the program will continue. If not, the program will wait until switch 168 is closed.

When switch 168 is closed, the computer senses the subject brightness by sampling the output on lines 184 from the light sensitive circuit 180. The computer also senses the subject distance by applying a signal to line 188 to activate the automatic range finder 186 and then samples the output on lines 192.

Signals representing the subject brightness $B_s$ and distance $D_s$ are stored in temporary memory 228. The computer then checks to see if switch 176 has been closed to supply power to flash circuit 210. If not, the computer may energize a display (not shown) to indicate to the photographer that the picture will be taken without flash and proceeds to calculate the camera adjustments that will optimize the picture according to the CQF without flash. Under these circumstances, the computer sets the flash time $T_f$ equal to 0. This capability is provided so that pictures may be taken under circumstances where flash is not desirable, such as in a church or museum where flash light is not allowed.

If the flash circuit has been activated, the computer proceeds to calculate the control parameters that will optimize the picture according to the CQF, including the optimum amount of flash output. The computer calculates the desired aperture and lens extension in terms of counts from the position sensor 88. COUNT A represents the number of counts desired for the aperture and COUNT L represents the number of counts desired for the lens. $T_s$ represents the optimum shutter time and $T_f$ the optimum flash duration. These computed values are stored in temporary memory 228.

The computer then checks to see whether a command has been given to take a picture, by sampling the input from switch 170. If the switch is open, the program waits until the switch has been closed. When the presence of a signal indicates that the switch has been closed, the program initializes a counter (by setting a variable COUNT=0) that will be used in setting lens and aperture positions. Next, the computer energizes the shutter holding magnet 118 so that the shutter will not close as soon as it is opened. The computer then starts motor 82 by activating the data storage latch that controls the output driver for the motor.

As the motor rotates cam 76 (see also FIG. 4) counterclockwise, cam follower 74 allows the control lever 71 to rotate counterclockwise under the influence of spring 78. The aperture and lens follow the motion of the control lever through their respective mechanical linkages. As control 71 moves, pulses are generated by the position sensor 88. Each pulse that is received by the computer from the position sensor causes a transfer to the interrupt routine shown in FIG. 8. The interrupt routine increments COUNT by 1 and then returns control to the place in the main program where the interrupt occurred. Meanwhile, the main program checks to see which is the larger, COUNT A or COUNT L.

If COUNT A is the larger, the program checks to see whether the lens has been stopped yet. At this stage of the operation, of course, the lens hasn't yet stopped, but as will be seen, this check is used later on as a means of getting out of this portion of the program. Next, the computer checks to see if COUNT equals COUNT L. When it does, the computer causes the lens to stop by energizing electromagnet 94 thereby causing latch 93 to inhibit further motion of crank 58 to stop the lens at the desired position.

Figure 8:
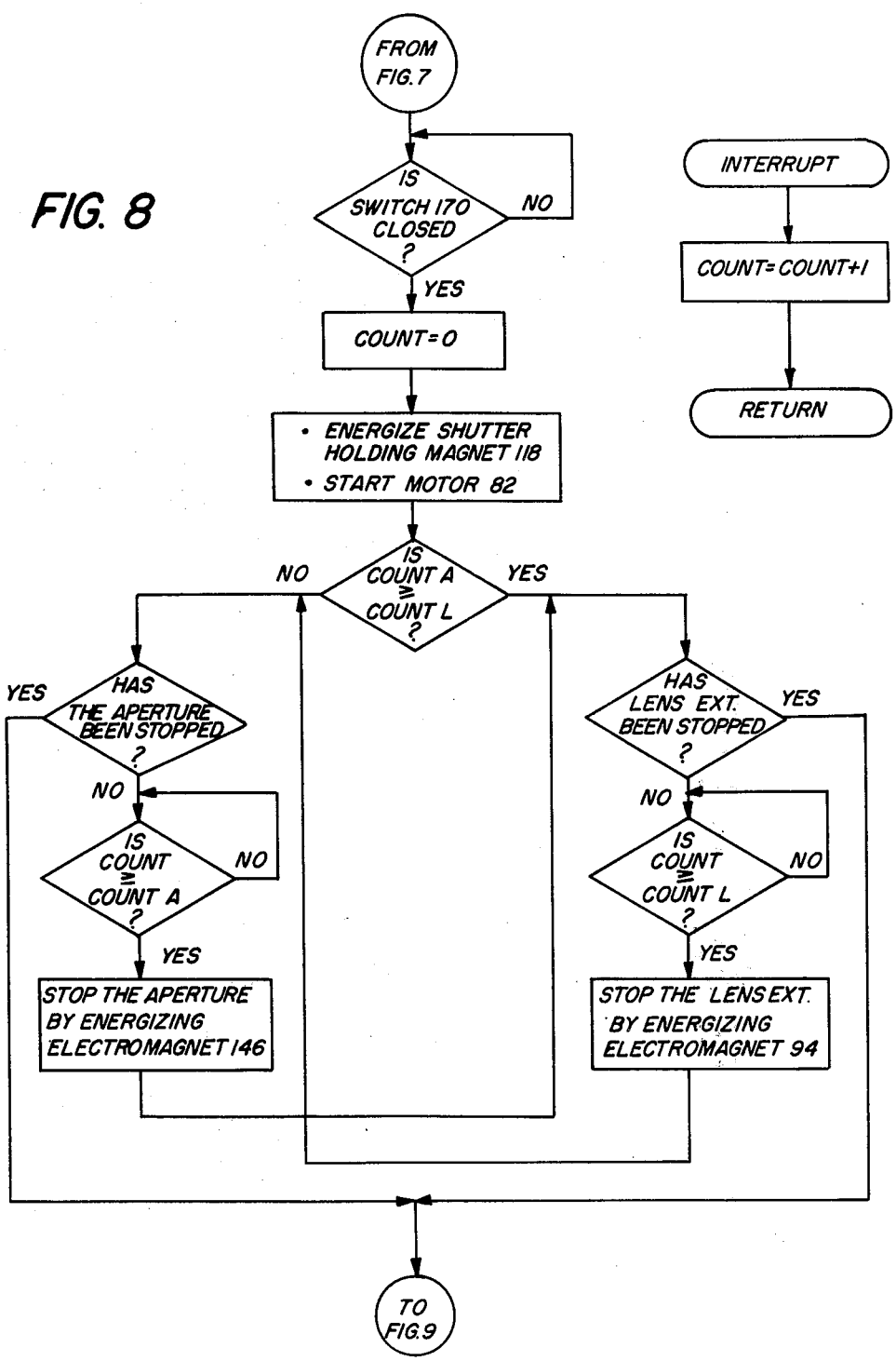

The computer then checks to see if the aperture has been stopped. Because COUNT A is larger than COUNT L in this example, of course, it hasn't; but this check is used to enable the program to continue after both the lens and the aperture have been set. The computer then checks to see whether COUNT is equal to or greater than COUNT A. When it is, the computer stops the aperture by applying a signal to the output drive that energizes electromagnet 146, thereby causing latch 142 to arrest further movement of the aperture. Next, the computer again checks to see whether the lens has previously been stopped. If it has been, the computer continues with the main program. Similarly, if COUNT A had been greater than COUNT L, the computer would have first set the aperture, then the lens, then continued as shown in FIG. 8. Subsequent interrupts caused by the pulses from sensor 88 continue to increment the COUNT but have no further affect on the execution of the main program.

Figure 9:
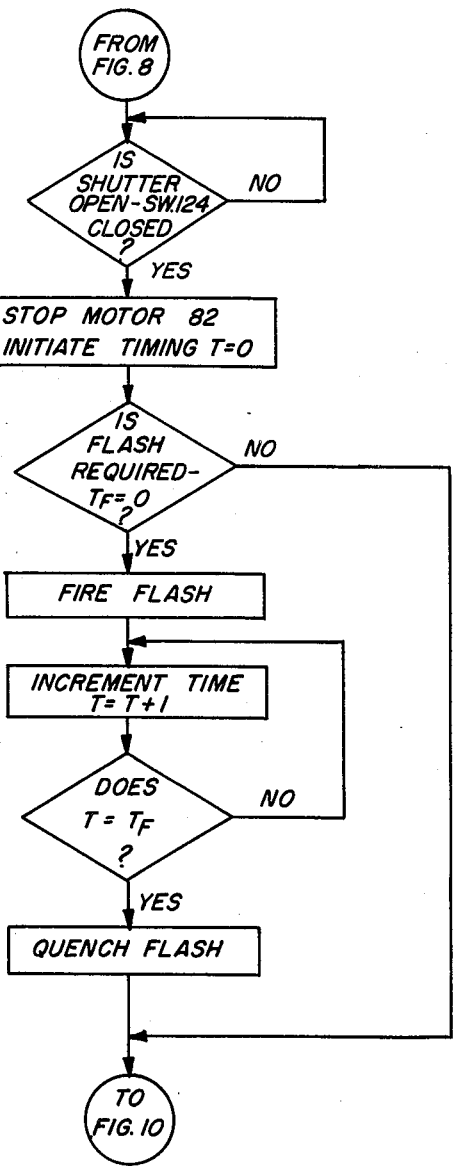

Proceeding to FIG. 9, after the lens and aperture have been set, the computer waits for the shutter to open. This is indicated by a signal from switch 124. Upon receiving the signal that the shutter has opened, the computer stops the motor by removing the drive signal to the motor control circuit and initiates an internal timing cycle by setting a variable T=0. The computer then checks to see if a flash is required by noting whether the flash interval $T_f$ is non-zero. If no flash is required, the computer immediately begins timing the shutter. If a flash is required, the computer signals the flash device to fire by applying a signal to line 220. Then the computer goes into a sequence of repeatedly incrementing T by 1 count and checking to see if it is time to quench the flash. When the proper time $T_f$ arrives, the computer signals the flash device to quench by applying a signal to line 22.

Figure 10:
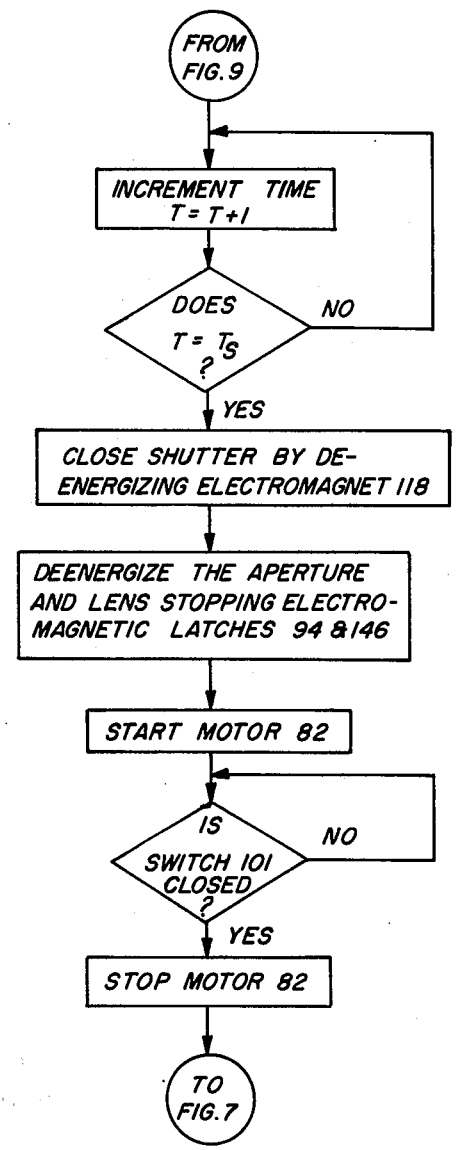

Continuing to FIG. 10, the shutter is then timed in a similar manner, and when the proper moment is reached the computer signals the shutter to close by de-energizing electromagnet 118.

The computer then prepares the apparatus for the next photographic cycle by de-energizing the lens stopping electromagnets 94 and 146. Motor 82 is then started to return the control lever 71 to its initial position. When the control lever reaches its initial position, the computer is signalled by the closing of switch 101 and the motor is stopped. The motor may also be coupled to a film advance mechanism adapted to wind film or process and eject an instant print during this portion of the motor cycle.

CALCULATION OF OPTIMUM CAMERA SETTINGS USING CQF

Using the CQF procedure according to the present invention, optimum settings for adjustable camera functions are determined for a given set of measured scene parameters by choosing those settings which maximize the CQF. The computation required to maximize the CQF for a given set of measured scene parameters may be performed by the computer in the automatic control apparatus on a picture-by-picture basis. However, since a relatively large amount of computation is required, it is preferable to perform the computation at the manufacturer's facility and then store the answers in the computer in the form of a mapping function for subsequent recall in response to a given set of measured scene parameters. A number of ways exist for determining the camera settings that result in a maximum CQF for a given set of measured scene parameters. For example, mathematical models of the Subjective Quality Factors (blur, smear and exposure) that make up the CQF may be constructed and, holding the measured scene parameters constant, the values of the camera settings may be perturbed either randomly or systematically while the resulting CQF is observed to find the combination of camera settings giving the highest CQF. Alternatively, the mathematical model of the CQF may be expressed in the form of a set of simultaneous equations, and the equations solved by known methods. To arrive at the preferred embodiment of the invention, the optimization of the CQF was performed graphically. Sets of optimized camera settings were calculated for a number of values of measured scene parameters over the normally encountered ranges of the parameters. Preferred camera settings for measured scene parameter values falling between the calculated values were determined by interpolation. The graphic method of optimizing CQF is the method that most clearly illustrates the concepts involved in the practice of the present invention and will be described with reference to FIGS. 11 through 18.

As defined in equation (1), the CQF is the integral on a log spatial frequency scale from the subject to infinity of several Subjective Quality Factors representing the performance of the camera under certain defined conditions. An SQF is an easily calculated and/or measured figure of merit which objectifies the subjective judgment of the viewer of an image. For a detailed discussion of SQF see "An Optical Merit Function (SQF), Which Correlates with Subjective Image Judgments" by E. M. Granger and K. N. Cupery, Photographic Science and Engineering, Vol. 16, No. 3, May-June 1972.

An SQF may be derived from the Optical Transfer Function (OTF) of a photographic system. The SQF thus derived represents the integral of the system Modulation Transfer Function (MTF) including lenses and film between 10-40 cycles per millimeter when the MTF is scaled to the retina of an observer by the magnification of the system including the eye, and is defined as follows:

$$SQF = K_1 \int_{10}^{40} |\tau(f)| \, d(\log f) \quad (2)$$

Where $\tau(f)$ is the OTF of the system; f is spatial frequency; $K_1$ is a normalizing constant obtained by performing the integration with $\tau = 1$; and the limits of integration are in lines/mm.

A two dimensional SQF may be defined for a system MTF expressed in polar coordinates as follows:

$$SQF = K_1 \int_{10}^{40} \int_0^{2\pi} |\tau(f,\theta)| \, d(\log f) d\theta \quad (3)$$

resulting in a number between 0 and 1.

For a camera of the type having a relatively high f-number lens, such as an instant camera, the SQF (BLUR) can be calculated from the following formula, assuming a perfect lens:

$$SQF(\text{BLUR}) = \frac{2J_1(\pi f_o \beta)}{\pi f_o \beta} \simeq \cos^2\left(\frac{\pi f_o \beta}{\sqrt{8}}\right) \quad (4)$$

where: $J_1$ is a first order Bessel function; fo = 1; and $\beta$ denotes the size of the blur circle for subjects at other than the nominal focus distance.

The size of the blur circle $\beta$ may be calculated from the thin lens formula as follows:

$$\beta = \frac{(D_1 - D_2) + \sqrt{(2F - D_2)^2 - 4F^2} - \sqrt{(2F - D_1)^2 - 4F^2}}{2 f/\#} \quad (5)$$

where: $D_1$—is the nominal focus distance; $D_2$—is the evaluation distance; F—is the focal length of the lens; and f/# is the f-number of the lens.

Figure 11:
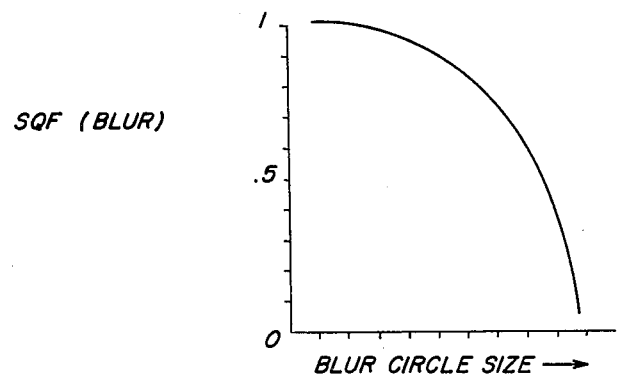
FIGS. 11-18 are graphs useful for describing the practice of the invention.

As can be seen from equations 4 and 5, the SQF(BLUR) is a function of the aperture adjustment and camera lens extension. FIG. 11 shows a graph of the SQF(BLUR) plotted against the size of the blur circle.

Figure 12:
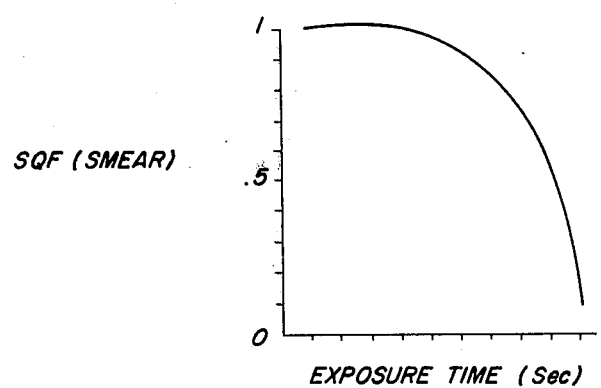

The SQF(SMEAR) is a function of camera displacement and/or subject motion during exposure and as such is strongly dependent upon exposure time for hand-held photography. The SQF(SMEAR) may be measured empirically and plotted against exposure time as shown in FIG. 12.

The nominal exposure condition for a camera may be defined as follows:

$$f/\# = \sqrt{\frac{TSB}{K_2}} \quad (6)$$

where: T = shutter time (sec); S = film ASA; B = subject brightness (ft-L); and $K_2$ = constant (~4.5)

Figure 13:
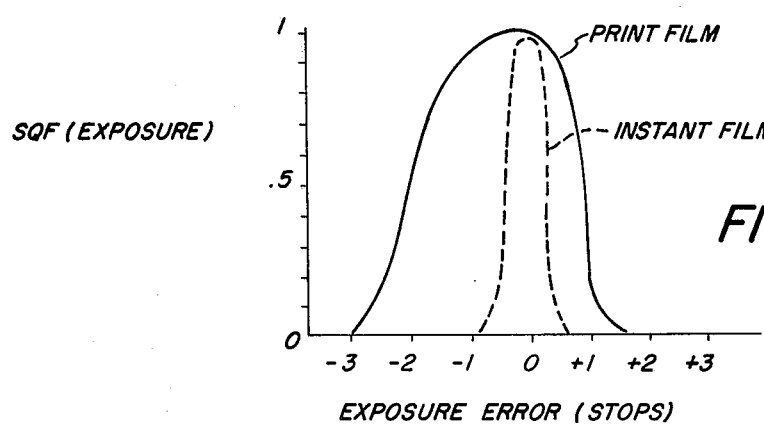

The SQF(EXPOSURE) may be experimentally derived and plotted against the deviation from nominal exposure in units of stops of exposure as shown in FIG. 13. The SQF(EXPOSURE) of a typical negative film for making photographic prints is shown as a solid curve in FIG. 13; that of a typical instant print film is shown as a dashed curve. The width of area under the curves is representative of the exposure latitude of the film. As can be seen, instant print film has a very narrow exposure latitude, showing a severe degradation of SQF(EXPOSURE) with an exposure error of only fractions of a stop. The negative print film, which has the wider exposure latitude, will tolerate a much larger exposure error before the SQF(EXPOSURE) is severely degraded. The SQF(EXPOSURE) is a function of the aperture size, shutter time, flash output, and subject distance (with flash).

Figure 14:
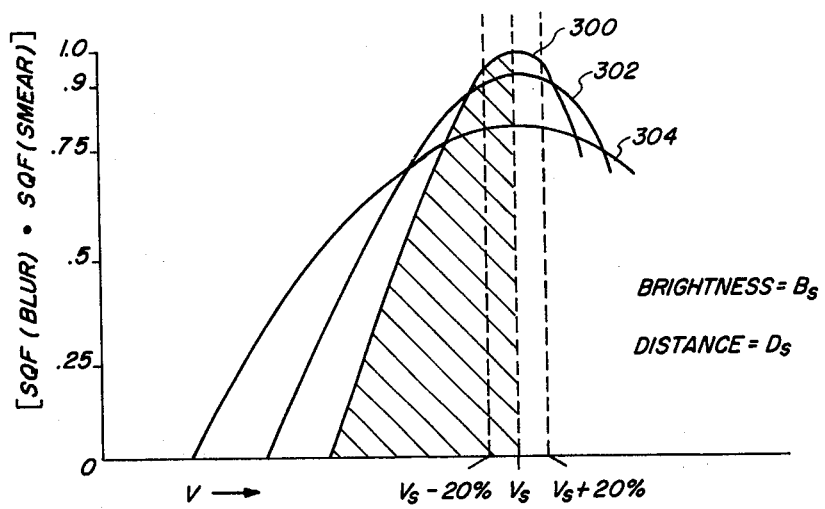

Once the SQF curves as shown in FIGS. 11, 12, and 13 have been generated, one may proceed to a graphical solution optimizing the CQF for a given set of scene parameters in the following manner. For a given scene brightness $B_s$ and main subject distance $D_s$, assume a nominal exposure and ambient illumination. Therefore the SQF(EXPOSURE) will equal 1. Also assume that the lens extension is set for optimum focus at the main subject distance $D_s$. Then plot the SQF(BLUR) times the SQF(SMEAR) from the subject distance to infinity (using the vergence) for several combinations of shutter and aperture that yield nominal exposure. A group of such plots is shown in FIG. 14. For example, the curve labelled 300 may represent f/8 at 1/125 of a second; the curve labelled 302 may represent f/11 at 1/60 of a second; and the curve labelled 304 may represent f/16 at 1/30 of a second. The CQF for each choice of settings is represented by the area under the respective curve from 0 to $V_s$, where $V_s$ is the vergence of the subject. For example, the area indicated by cross-hatching under the curve labelled 300 represents the CQF of the photographic system with the aperture adjusted to f/8 and the shutter speed set at 1/125 of a second.

The various shapes of the curves in FIG. 14 may be explained qualitatively in the following manner. Curve 300 has a higher value near $V_s$ due to the fact that the faster shutter speed results in less smear. However, it falls off faster away from $V_s$ due to the blurring of the background because of the larger aperture. In comparison, curve 304 has a lower value near $V_s$ due to the increased smear caused by the slower shutter speed. However, its value falls off less severely at greater distances because of decreased blur in the background due to the smaller aperture.

In reality, the range information indicating the distance to the main subject will have inaccuracies within certain tolerances. To reflect this inaccuracy, a constraint is placed upon the definition of CQF such that the area under an SQF curve will not be considered unless the SQF, in a band representing the tolerances or the accuracy of the range information, say 20% on either side of $V_s$, is above some value, say 0.9. Using this constraint, that combination of aperture size and shutter time is chosen which maximize the CQF for the particular subject brightness and distance under consideration. The above process is repeated for a number of brightness and distance combinations to arrive at the desired aperture size and shutter time for each combination of brightness and distance. Thus, in effect, the camera exposure control sytem produces a unique exposure control program for each subject distance.

Figure 15:
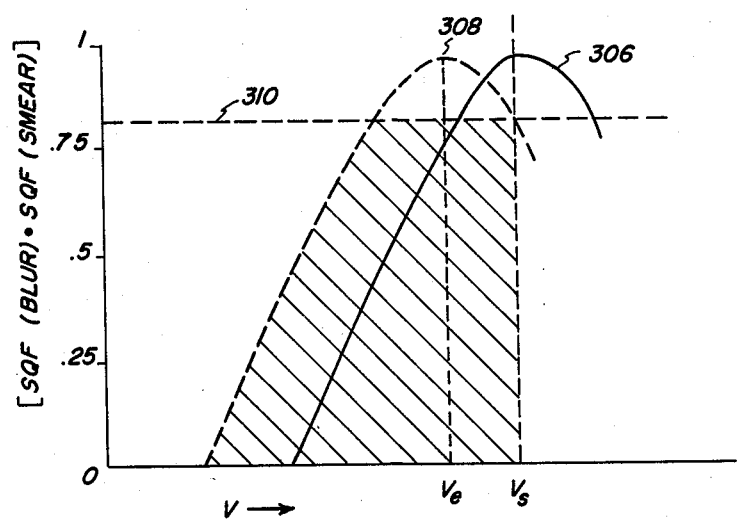

In the same way that the aperture size can be traded for shutter speed to maximize CQF, a lens extension other than the nominal lens extension for the given subject distance may be chosen to increase the CQF by optimizing the overall sharpness of the picture. Choosing a lens position other than nominal has the effect of sliding the SQF curve along the V axis as shown in FIG. 15. In FIG. 15, the curve 306 represents the SQF for the lens at the nominal extension to provide best focus for a subject at a vergence $V_s$. Curve 308 represents the SQF with the lens displaced to provide best focus at an evaluation distance (vergence) $V_e$. Curves may be constructed for several evaluation distances (vergences) to see if the CQF can be improved. The CQF is evaluated only under a line 310 that passes through the value of the SQF curve at the subject distance $V_s$ so that undue credit will not be given for upgrading background SQF at the expense of degrading the subject SQF.

Figure 7:
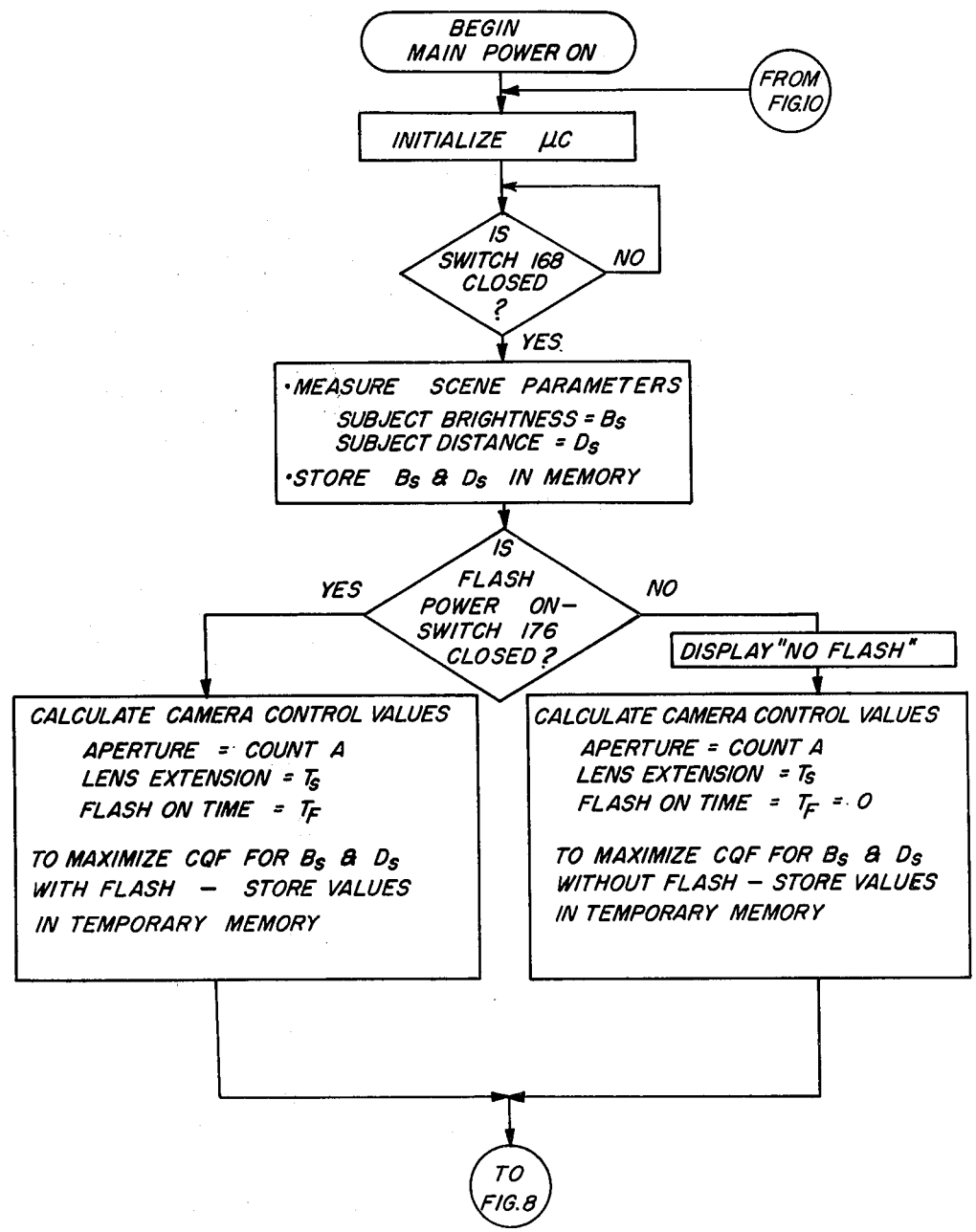
FIGS. 7-10 are flow charts showing the operation of the automatic camera control apparatus according to the present invention.

The combination of aperture size, shutter speed and lens extension which maximize the CQF for each subject brightness and distance combination are chosen to arrive at the mapping function. This is the mapping function that is stored in the memory of the microcomputer for operation without flash, as shown in FIG. 7.

Figure 16:
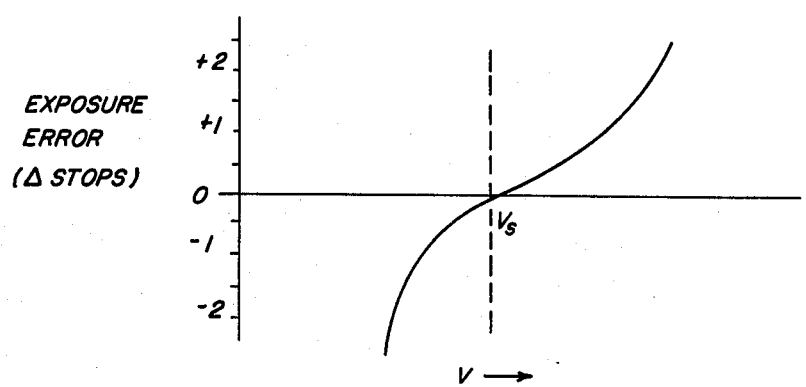
Figure 17:
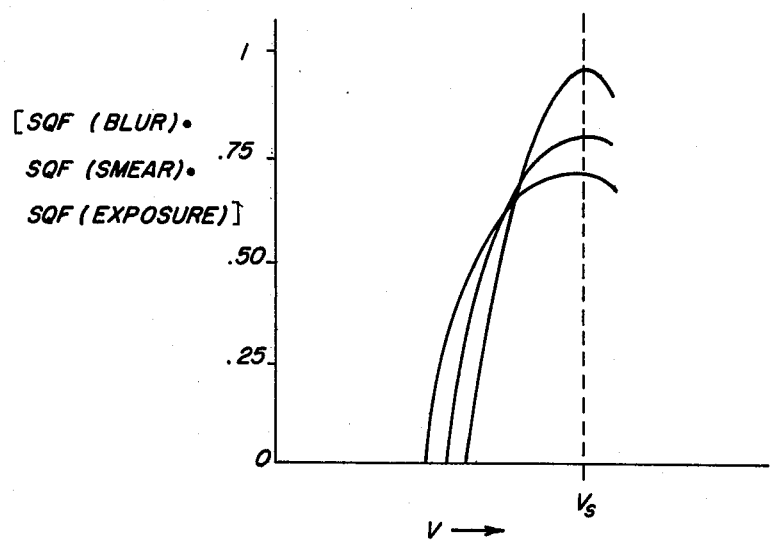

If flash illumination is employed, the CQF can be optimized by the following procedure. Assuming a perfect lens, nominal focus position, a small aperture, and no relative motion between the subject and the camera, the exposure error as a function of distance during flash exposure can be calculated as an inverse square function of the distance from the flash device to the subject. The exposure error, in stops, is plotted as a function of the vergence as shown in FIG. 16. Graphs of SQF may be drawn for fixed amounts of flash at a particular subject distance and brightness. Such a set of graphs is shown in FIG. 17. In this case, the SQF includes a contribution from SQF(EXPOSURE) which varies as a function of V and is obtained from FIG. 16. It should be noted that the SQF(SMEAR) at the subject is determined mainly by the duration of the flash, which is usually very short, when the output of the flash device is relatively large. The SQF(SMEAR) is determined mainly by the shutter time, when the output of the flash device is relatively small. As seen in FIG. 17, which is shown for a relatively low subject brightness and relatively high flash amount, the SQF falls off rather rapidly with distance due to the degradation of SQF(EXPOSURE) with the inverse square reduction of flash illumination. This procedure is repeated for several amounts of flash at each subject brightness and subject distance. The amount of flash combined with the aperture size and shutter speed that result in the maximum CQF are selected for each brightness and distance combination to arrive at the final mapping function. It should be noted that, in some cases, a maximum CQF is obtained when the subject is slightly overexposed and the background more nearly properly exposed.

Figure 18:
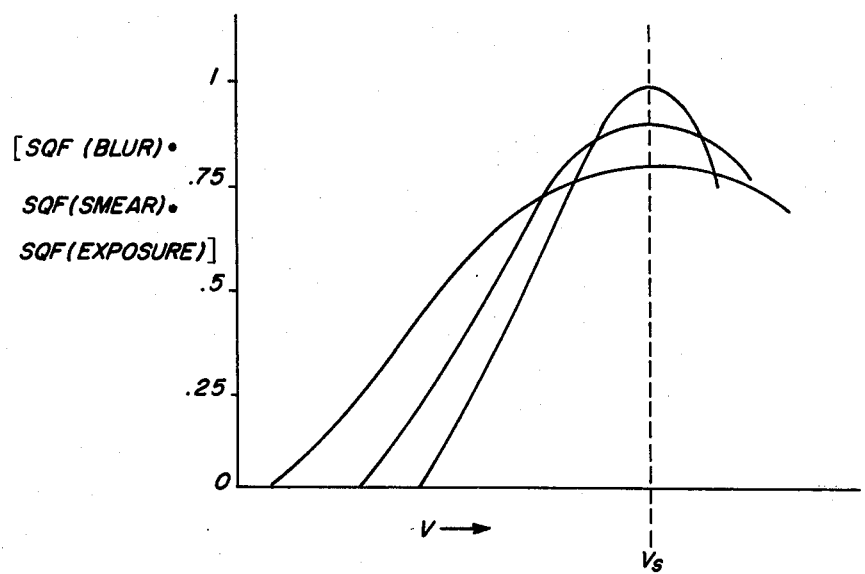

For film with a relatively wide exposure latitude, such as negative print film, it is possible, and often desirable, to effect a compromise between nominal exposure and image sharpness to maximize the CQF. For example, using the SQF plots in FIG. 14 as a starting point where the exposure error equals 0, a new set of graphs can be constructed, assuming, for example, an exposure error of 1 stop. From FIG. 13, the degradation in SQF(EXPOSURE) due to one stop exposure error using negative print film can be found. This value for SQF(EXPOSURE) is then used in constructing the SQF curves as shown in FIG. 18. Several combinations of aperture and shutter speed which result in one stop of underexposure are chosen and the resulting SQF curves are plotted. This process is repeated for several values of exposure error and the CQF is computed as the area under each curve. The combination of aperture size and shutter speed that results in the maximum CQF, even though it may result in some exposure error, is chosen for the evaluation subject brightness and distance. This process is then repeated for each brightness and distance combination to arrive at the mapping function.

It should now be apparent that the settings of the camera control functions as selected by the automatic camera control apparatus according to the present invention result in a picture which a viewer will judge as having an optimum image quality. Obviously, numerous modifications and variations of the present invention are possible in light of the above teachings. For example, the measured scene parameters may include distances to objects in other parts of the scene i.e., the background; brightnesses in other parts of the scene; scene contrast; relative motion between parts of the scene; and relative motion between the scene and the camera. Camera functions may include automatic disabling of further operations when conditions for achieving a satisfactory photograph are not met, visual warnings to the photographer when certain limits are exceeded, and visual indications of the values of the optimized camera adjustments for each picture.

We claim:

1. In a photographic camera having a mechanism for adjusting one or more of the following camera functions: aperture size, shutter speed, flash output, and lens extension, an automatic camera control apparatus responsive to measured scene parameters including at least subject brightness and subject distance, for adjusting the mechanism, said control apparatus comprising:
   logic means including a memory unit, said memory unit containing signals representing a mapping function defining the adjustment of said mechanism for particular combinations of values of scene parameters said adjustment being determined by maximizing an objective figure of merit relating measurable photographic parameters to subjectively perceived picture quality;
   means for measuring the values of such scene parameters for a particular scene to be photographed;
   means controlled by said measuring means for supplying said logic means with signals representing the measured values;
   said logic means being responsive to said signals representing the measured values for producing signals representing corresponding values for the adjustment of the mechanism determined by said mapping function; and
   control means responsive to the signals produced by said logic means for adjusting the mechanism to the produced values.

2. The invention claimed in claim 1, wherein said objective figure of merit comprises a Composite Quality Factor comprising the integral of one or more Subjective Quality Factors representing blur, smear and exposure evaluated at the subject distance and at a plurality of background distances.

3. In a camera having an adjustable shutter and an adjustable lens aperture, means for adjusting the shutter and lens aperture, comprising:
   logic means including a memory unit, said memory unit containing signals representing a mapping function defining the exposure duration and aperture size for particular combinations of subject distance and scene brightness, said exposure duration and aperture size being determined by maximizing an objective figure of merit relating physically measurable photographic parameters to picture quality;
   means for measuring the values of subject distance and scene brightness of a particular scene to be photographed;
   means controlled by said measuring means for entering into said logic means, signals representing the measured values;
   said logic means being responsive to said signals representing the measured values, for producing signals representing corresponding values of exposure duration and aperture size determined by said mapping function; and
   control means responsive to the signals produced by said logic means for adjusting the shutter and lens aperture to the produced values.

4. The invention claimed in claim 3, wherein said objective figure of merit comprises a Composite Quality Factor comprising the integral of one or more Subjective Quality Factors representing blur, smear and exposure evaluated at the subject distance and at a plurality of background distances.

5. An automatic control system for a photographic camera, comprising: electronic flash means for controllably illuminating a scene; shutter means having a controllable open time for effecting a timed exposure; aperture means having a controllable aperture size for controlling the rate of exposure; focus means having an adjustable lens extension; brightness measuring means for measuring the brightness of the subject; distance measuring means for measuring the distance to the subject; and logic and control means for adjusting the light output of said electronic flash means, the open time of said shutter means, the aperture size of said aperture means, and the lens extension of said focus means in response to the distance information measured by said distance measuring means and the brightness information measured by said brightness measuring means, said adjustments being determined by maximizing an objective figure of merit relating measurable photographic parameters to subjectively perceived picture quality, thereby effecting compromises between aspects of picture sharpness and exposure to optimize overall picture quality.

6. The invention claimed in claim 5, wherein, said logic and control means comprises a computer including a memory unit, said memory unit containing signals representing a mapping function defining said adjustments for particular conditions of brightness and distance.

7. The invention claimed in claim 6, wherein, said objective figure of merit comprises a Composite Quality Factor comprising the integral of one or more Subjective Quality Factors representing blur, smear, and exposure evaluated at the subject distance and at a plurality of background distances.

8. In a photographic camera having a mechanism for adjusting one or more of the following camera functions: aperture size, shutter speed, flash output, and lens extension, an automatic camera control system, comprising:
   means for measuring scene brightness;
   means for measuring subject distance; and
   logic and control means connected to said brightness and distance measuring means and responsive to the measured scene brightness and subject distance for controlling the adjustment of the camera mechanism, the adjustment produced by said logic and control means being determined by maximizing a Composite Quality Factor defined as the integral on a log spatial frequency scale from the subject to infinity of one or more Subjective Quality Factors representing blur, smear, and exposure error, whereby said camera control system effects a tradeoff between all aspects of camera performance to produce the best quality picture for each combination of subject distance and scene brightness.

9. The invention claimed in claim 8, wherein said logic and control means comprises a digital computer programmed with a mapping function defining the mechanism adjustment that maximizes the Composite Quality Factor for each combination of subject distance and scene brightness.

10. In a photographic camera of the type having an adjustable exposure aperture, an adjustable shutter speed, and an automatic exposure control mechanism, including scene brightness measuring means, capable of providing a plurality of exposure control programs, an automatic exposure control program selection system comprising:
   subject distance measuring means; and
   logic and control means connected to said subject distance measuring means and responsive to the measured subject distance for selecting an exposure control program, the exposure control program selected by said logic and control means being determined by maximizing an objective figure of merit relating physically measurable photographic parameters to picture quality.

11. The automatic exposure control program selection system claimed in claim 10, wherein said objective figure of merit comprises an Objective Quality Factor defined as the integral from the subject to infinity of one or more Subjective Quality Factors representing blur, smear, and exposure error.

* * * * *